(12) United States Patent
Tziovaras et al.

(10) Patent No.: US 10,662,581 B2
(45) Date of Patent: May 26, 2020

(54) METHOD FOR THE PARTIAL COLORING OF PLASTIC PARTS

(71) Applicant: Covestro Deutschland AG, Leverkusen (DE)

(72) Inventors: Georgios Tziovaras, Neuss (DE); Ciro Piermatteo, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 16/088,494

(22) PCT Filed: Mar. 24, 2017

(86) PCT No.: PCT/EP2017/057036
§ 371 (c)(1),
(2) Date: Sep. 26, 2018

(87) PCT Pub. No.: WO2017/167651
PCT Pub. Date: Oct. 5, 2017

(65) Prior Publication Data
US 2019/0106837 A1 Apr. 11, 2019

(30) Foreign Application Priority Data
Mar. 29, 2016 (EP) ..................... 16162536

(51) Int. Cl.
D06P 5/20 (2006.01)
B44C 1/22 (2006.01)
C09B 67/00 (2006.01)
B44C 1/00 (2006.01)
B32B 27/16 (2006.01)
B32B 27/30 (2006.01)
B32B 27/24 (2006.01)
B32B 27/08 (2006.01)
B32B 27/40 (2006.01)
B32B 27/32 (2006.01)
B32B 27/34 (2006.01)
B32B 27/28 (2006.01)
B32B 27/36 (2006.01)
B32B 27/20 (2006.01)
B32B 27/42 (2006.01)
C09B 1/16 (2006.01)
D06P 3/00 (2006.01)
B41M 5/24 (2006.01)
B41M 5/26 (2006.01)
C09B 67/40 (2006.01)
B42D 25/435 (2014.01)

(52) U.S. Cl.
CPC ............ D06P 5/2005 (2013.01); B32B 27/08 (2013.01); B32B 27/16 (2013.01); B32B 27/205 (2013.01); B32B 27/24 (2013.01); B32B 27/286 (2013.01); B32B 27/302 (2013.01); B32B 27/32 (2013.01); B32B 27/325 (2013.01); B32B 27/34 (2013.01); B32B 27/365 (2013.01); B32B 27/40 (2013.01); B32B 27/42 (2013.01); B44C 1/005 (2013.01); B44C 1/228 (2013.01); C09B 1/16 (2013.01); C09B 67/0082 (2013.01); D06P 3/003 (2013.01); B32B 2307/4023 (2013.01); B32B 2307/4026 (2013.01); B32B 2307/414 (2013.01); B32B 2307/718 (2013.01); B32B 2457/00 (2013.01); B32B 2605/08 (2013.01); B41M 5/24 (2013.01); B41M 5/262 (2013.01); B41M 5/267 (2013.01); B42D 25/435 (2014.10)

(58) Field of Classification Search
CPC ........ D06P 5/2005; D06P 3/003; B44C 1/228; B44C 1/005; C09B 67/0082; C09B 1/16; B42D 25/435; B41M 5/267; B41M 5/24; B41M 5/262; B32B 27/16; B32B 27/302; B32B 27/24; B32B 27/08; B32B 27/40; B32B 27/32; B32B 27/34; B32B 27/286; B32B 27/365; B32B 27/205; B32B 27/41; B32B 27/325
See application file for complete search history.

(56) References Cited

U.S. PATENT DOCUMENTS

| 3,692,744 | A | 9/1972 | Rich et al. |
| 4,176,224 | A | 11/1979 | Bier et al. |
| 4,982,014 | A | 1/1991 | Freitag et al. |
| 5,733,651 | A | 3/1998 | Wank et al. |
| 7,771,646 | B2 | 8/2010 | Clauss et al. |
| 9,079,443 | B2 | 7/2015 | Pudleiner et al. |

(Continued)

FOREIGN PATENT DOCUMENTS

| DE | 1900270 A1 | 11/1969 |
| DE | 2407674 A1 | 10/1974 |

(Continued)

OTHER PUBLICATIONS

International Search Report for PCT/EP2017/057036 dated May 24, 2017.

(Continued)

Primary Examiner — Amina S Khan
(74) Attorney, Agent, or Firm — Faegre Drinker Biddle & Reath LLP

(57) ABSTRACT

The present invention concerns a method for the partial dyeing, in particular for the colour laser engraving, of plastic components, in particular thermoplastic plastic components, more particularly thermoplastic plastic components, comprising a layer construction as well as the resulting partially dyed, preferably colour laser engraved plastic components, in particular thermoplastic plastic components.

13 Claims, No Drawings

(56) References Cited

U.S. PATENT DOCUMENTS

| | | |
|---|---|---|
| 2005/0277714 A1 | 12/2005 | Chang et al. |
| 2009/0186758 A1* | 7/2009 | Ukpabi .................. B41M 5/267 503/201 |
| 2012/0001413 A1 | 1/2012 | Pudleiner et al. |

FOREIGN PATENT DOCUMENTS

| | | | |
|---|---|---|---|
| DE | 2407776 A1 | 9/1975 | |
| DE | 2715932 A1 | 10/1978 | |
| DE | 3832396 A1 | 2/1990 | |
| DE | 102010019683 A1 | 11/2011 | |
| EP | 0359953 A1 | 3/1990 | |
| EP | 0691201 A2 | 1/1996 | |
| EP | 2050866 A2 | 4/2009 | |
| EP | 2179857 A1 | 4/2010 | |
| EP | 2752302 A2 | 7/2014 | |
| FR | 1561518 A | 3/1969 | |
| GB | 1229482 A | 4/1971 | |
| GB | 1464449 A | 2/1977 | |
| JP | 359182408 | * 10/1984 | ............... G02B 5/20 |
| JP | 2012011688 A | 1/2012 | |
| JP | 2012011689 A | 1/2012 | |
| WO | WO-03040461 A1 | 5/2003 | |
| WO | WO-03056507 A1 | 7/2003 | |
| WO | WO-03083207 A1 | 10/2003 | |
| WO | WO-200450766 A1 | 6/2004 | |
| WO | WO-200450767 A1 | 6/2004 | |
| WO | WO-2005033218 A1 | 4/2005 | |
| WO | WO-2006042714 A1 | 4/2006 | |
| WO | WO-2010089035 A1 | 8/2010 | |

OTHER PUBLICATIONS

Written Opinion of the International Searching Authority for PCT/EP2017/057036 dated May 24, 2017.

* cited by examiner

METHOD FOR THE PARTIAL COLORING OF PLASTIC PARTS

CROSS-REFERENCE TO RELATED APPLICATIONS

This application is a national stage application (under 35 U.S.C. § 371) of PCT/EP2017/057036, filed Mar. 24, 2017, which claims benefit of European Application No. 16162536.3, filed Mar. 29, 2016, both of which are incorporated herein by reference in their entirety.

The present invention concerns a method for the partial dyeing, in particular for the colour laser engraving, of plastic components, in particular thermoplastic plastic components, more particularly thermoplastic plastic components, comprising a layer construction as well as the resulting partially dyed, preferably colour laser engraved plastic components, in particular thermoplastic plastic components.

BACKGROUND OF THE INVENTION

The possibility of colour engraving plastic components by means of a laser is of interest to the entire plastic component manufacturing industry. It is the colour laser engraving of three-dimensional moulded plastic components, for example for the automotive industry, that is of interest here. Switches, panels etc. can for example be engraved with coloured symbols. Plastic components with a coating for surface protection can also be colour engraved by means of a laser. The laser beam removes the coating layer and dye simultaneously migrates into the plastic component surface at this point. Unprotected plastic surfaces can also be colour laser engraved and subsequently coated in order to guarantee a consistently glossy appearance of the plastic components and offer protection against scratching and chemical damage. Until now such coloured symbols have for example been produced during the first manufacturing step by means of plastic injection moulding with several coloured components. The plastic components must be coated with a covering colour during a second manufacturing step. The colour layer must then be engraved by means of a laser during a third manufacturing step in order to expose the underlying plastic surface. A protective coating can optimally be applied during a fourth manufacturing step.

Alternatively transparent plastic film can be colour engraved on the back and then back-injected with a thermoplastic according to the film insert moulding method in order to obtain glossy surfaces of a consistent appearance. This method is for example disclosed as example 1 in EP-A 0691201.

On the security and/or value document market, in particular for identification documents (ID documents), there exists a requirement for the colour personalisation of these documents by means of a laser. The personalisation of ID documents consisting partially or completely of polymer film with the laser engraving method represents prior art. However, currently known methods create only images and text of various grey scales in such documents. Colour elements cannot be produced by means of laser engraving. Only in combination with prior typographically applied colour layers, which are then changed by means of a laser, is it possible to generate colour images in or on plastic components.

In recent years methods have been developed that allow the creation of colour elements in these documents which are wholly or partially made of polymer film, in particular within the area of security and/or value documents, in particular ID documents. These methods are however connected with a substantial technical effort. All methods include a printing process for realising the colour design.

WO-A 03/056507 discloses a method where a colour image can be created by means of laser engraving as follows: a colour that will react with a specific wavelength of laser light is printed onto the entire surface of a film, on the surface of which a colour image is later to be created. The reaction takes the form of a bleaching of colour pigments as soon as these are exposed to the laser. If three types of pigment are used, for example red, yellow, blue, which react a three different wavelengths, it is possible to create full-colour images in that the pigments are bleached accordingly at the laser-irradiated points. This method is however particularly tedious, as three different laser sources have to be used and the colour must be printed onto the entire surface. This means that the compound adhesion of the film will not be good enough in the area of the image following laminating.

A further method is disclosed in EP-A 2752302 and is based on the principle of a colour display: narrow lines in the base colours red, yellow, blue are printed onto film. These lines are then selectively blackened by means of a laser to create the impression of a colour image. This method is also tedious, as printing must be highly accurate in the run-up in order to create the image. The resolution of the image is also very rough, as the lines cannot fall below a distance of approx. 80 µm and the images appear dark because a large part of the image surface is blackened by the laser.

The printing of film by means of inkjet is described in JP-A 2012-011688 as a further method. For this the print motives are conventionally printed onto the film with an inkjet printer and the ink is fixed with a laser. This method is comparable to the widely used UV curing ink system. Instead of UV light a laser is simply used here to fix the ink. With this method the ink remains on the plastic surface. This method is particularly unsuitable for engraving security documents because the ink can be rubbed off the plastic surface.

JP-A 2012-011689 discloses a method and an apparatus for the colour laser printing of moulded components without damaging the substrate. With this method the ink is applied to the moulded component by means of an inkjet and this ink is then fixed on said moulded component with a laser beam.

EP-A 2179857 discloses layer constructions for ID card to be written on by means of laser engraving, which have an additional layer that is applied to the card body following said laser engraving and limit or completely prevent subsequent writing on the card by means of laser engraving and therefore the forging of existing information. Colour laser engraving is not disclosed.

WO-A 2005/033218 discloses coating compositions containing iron blue pigment, which are suitable for producing a laser engravable coating layer that can be laser engraved in a way that is powder- and residue-free with a laser. The coating layer is removed and corresponding information applied by means of laser engraving here.

It is therefore the task of the present invention to provide an improved and simple method for the partial dyeing, in particular for the colour laser engraving of plastic components, preferably of thermoplastic plastic components, more preferably of plastic film and/or film layer compounds.

BRIEF SUMMARY OF THE INVENTION

This task is surprisingly solved by the method according to the invention for the partial dyeing, in particular the colour laser engraving of plastic components, in particular thermoplastic plastic components, including the steps
i) submerging a plastic component in a dye bath,
ii) possibly the heating of the dye bath,
iii) irradiation of the plastic component from i) and possibly ii) with focussed non-ionising electromagnetic radiation, preferably focussed non-ionising electromagnetic radiation with a wavelength within a range of ≥0.1 µm to ≤1 mm, more preferably within a range of ≥0.15 µm to ≤20 µm, most preferably with laser radiation within a range of ≥0.15 µm to ≤20 µm,
wherein the partial dyeing substantially happens only at the points irradiation during step iii).

"Substantially" is understood as part of this invention in that a colour element that is discernible with the naked eye as a clearly visible colour element is created only at the points irradiated during step iii). It is not ruled out here that a slight dyeing of the plastic component may occur at non-irradiated points.

DETAILED DESCRIPTION OF THE INVENTION

The method according to the invention is characterised in that a partial dyeing of the plastic component, in particular a thermoplastic plastic component, substantially happens at the points irradiated during step iii). The rest of the plastic component has no or only very weak dyeing in the non-irradiated areas. It is therefore possible to dye areas of the plastic component in a targeted way, for example for applying an image, personalisation, logo, symbol or writing onto this plastic component by means of the method according to the invention. These cannot be easily removed from the plastic component surface. The method according to the invention is therefore in particular suitable for the area of manufacturing security and identification documents.

These colour elements reach particularly high resolutions of 5000 dpi, and possibly even more, in particular during irradiation with laser radiation. The method according to the invention requires neither high-precision printing technology nor the use of different laser strengths as long as the irradiation during step iii) is carried out with laser radiation. The method according to the invention is also suitable for the application of colour elements onto three-dimensional plastic components as well as onto film and/or film layer compounds.

A multitude of plastic components, in particular thermoplastic plastic components, can be used with the method according to the invention. With the preferably thermoplastic plastic components this can preferably be a thermoplastic plastic component selected from polymerisates of ethylenically unsaturated monomers and/or polycondensates of bifunctionally reactive compounds and/or polyaddition products of bifunctionally reactive compounds. For specific applications such as for example within the area of identification documents it can be of advantage, and is therefore preferred, to use a transparent thermoplastic plastic.

Particularly preferred thermoplastic plastics are one or more polycarbonate(s) or copolycarbonate(s) on a basis of diphenols, poly- or copolyacrylate(s) and poly- or copolymethacrylate(s) such as for example and preferably polymethylmethacrylate or poly(meth)acrylate (PMMA), poly- or copolymer(s) with styrol such as for example and preferably polystyrol (PS), acrylnitrile-butadiene-styrol (ABS), or polystyrolacrylnitrile (SAN), thermoplastic polyurethane(s) as well as polyolefine(s) such as for example and preferably polypropylene types or polyolefines on the basis of cyclic olefines (for example TOPAS™, Hoechst), poly- or copolycondensate(s) of terephthalic acid such as for example and preferably poly- or copolyethylene terephthalate (PET or CoPET), glycol-modified PET (PETG), glycol-modified poly- or copolycyclohexane dimethylenterephthalate (PCTG) or poly- or copolybutyl enterephthalate (PBT or CoPBT), polyamide (PA), poly- or copolycondensate(s) of naphthalinic dicarboxylic acid such as for example and preferably polyethylene glycolnaphthalate (PEN), poly- or copolycondensate(s) of at least one cycloalkyldicarboxylic acid such as for example and preferably polycyclohexane dimethanolcyclohexane dicarboxylic acid (PCCD), polysulfone (PSU), mixtures of the above mentioned or their blends.

Particularly preferred thermoplastic plastics are one or more polycarbonate(s) or copolycarbonate(s) on a basis of diphenols or blends containing at least one polycarbonates or copolycarbonate. Particularly preferred are blends containing at least one polycarbonate or copolycarbonate and at least one poly- or copolycondensate of terephthalic acid, of naphthalindicarboxylic acid or a cycloalkyldicarboxylic acid, preferably of cyclohexanedicarboxylic acid. Particularly preferred are polycarbonates or copolycarbonates, in particular with median molecular weights Mw of 500 to 100 000, preferably of 10,000 to 80,000, particularly preferably of 15,000 to 40,000 or their blends with at least one poly- or copolycondensate of terephthalic acid with median molecular weights Mw of 10,000 to 200,000, preferably of 21,000 to 120,000.

Suitable poly- or copolycondensates of terephthalic acid of preferably embodiments of the invention are polyalkylenterephthalates. Suitable polyalkylenterephthalates are for example reaction products of aromatic dicarboxylic acids or their reactive derivatives (for example dimethylesters or anhydrides) and aliphatic, cylcoaliphatic or araliphatic diols and mixtures of these reaction products.

Preferred polyalkylenterephthalates can be produced from terephthalic acid (or its reactive derivatives) and aliphatic or cycloaliphatic diols with 2 to 10 C atoms with the aid of conventional methods (Kunststoff-Handbuch, vol. VIII, p. 695 if, Karl-Hanser-Verlag, Munich 1973).

Preferred polyalkylenterephthalates contain at least 80 mol %, preferably 90 mol % terephthalic acid radicals, related to the dicarboxylic acid component, and at least 80 mol %, preferably at least 90 mol % ethylene glycol and/or butandiol-1,4- and/or 1,4-cyclohexandimethanol radicals, related to the diol component.

The preferred polyalkylenterephthalates can contain, in addition to terephthalic acid radicals, up to 20 mol % radicals of other aromatic dicarboxylic acids with 8 to 14 C atoms or aliphatic dicarboxylic acids with 4 to 12 C atoms, such as for example radicals of phthalic acid, isopthalic acid, naphthalin-2,6-dicarboxylic acid, 4,4'-diphenyldicarboxylic acid, succinic acid, adipic, sebacic acid, azelaic acid, cyclohexane diacetic acid.

The preferred polyalkylenterephthalates can, in addition to ethylene or butandiol-1,4-glycol radicals, contain up to 80 mol % of other aliphatic diols with 3 to 12 C atoms or cycloaliphatic diols with 6 to 21 C atoms, for example radicals of propanediol-1,3, 2-ethylpropanediol-1,3, neopentylglycol, pentanediol-1,5, hexanediol-1,6, cyclohexanedimethanol-1,4, 3-methylpentandiol-2,4, 2-methylpentandiol-2,4, 2,2,4-trimethylpentandiol-1,3 and 2-ethylhexandiol-1,6, 2,2-diethylpropanediol-1,3, hexanediol-2,5, 1,4-di-([beta]-hydroxyethoxy)-benzene, 2,2-bis-(4-hydroxycyclohexyl)-propane, 2,4-dihydroxy-1,1,3,3-tetramethyl-cyclobutane, 2,2-bis-(3-[beta]- hydroxyethoxyphenyl)-propane and 2,2-bis-(4-hydroxypropoxyphenyl)-propane (see DE-OS 24 07 674, 24 07 776, 27 15 932).

The polyalkylenterephthalates can be branched by installing relative small quantities of 3- or 4-valent alcohols or 3- or 4-basic carboxylic acids, as for example described in DE-OS 19 00 270 and U.S. Pat. No. 3,692,744. Example of preferred branching agents are trimesic acid, trimellitic acid, trimethylolethane and -propane and pentaerythrite.

No more than 1 mol % of the branching agent, related to the acid component, is preferably used.

Particularly preferred are polyalkylenterephthalates produced only from terephthalic acid and its reactive derivatives (for example its dialkylesters) and ethylene glycol and/or Butandiol-1,4 and/or 1,4-Cyclohexandimethanol radicals, and mixtures of these polyalkylenterephthalates.

Preferred polyalkylenterephthalates are also copolyesters manufactured from at least two of the above mentioned acid components and/or from at least two of the above mentioned alcohol components, particularly preferred copolyesters are poly-(ethyleneglycol/butandiol-1,4)-terephthalates.

The polyalkylenterephthalates preferably used as the component preferably have an intrinsic viscosity of approx. 0.4 to 1.5 dl/g, preferably 0.5 to 1.3 dl/g, each measures in phenol/o-dichlorbenzene (1:1 parts by weight) at 25° C.

In particularly preferred embodiments of the invention the blend consists of at least one polycarbonate or copolycarbonate with at least one poly- or copolycondensate of terephthalic acid for a blend of at least one polycarbonate or copolycarbonate with poly- or copolybutylenterephthalate or glycol-modified poly- or copolycyclohexane-dimethylenterephthalate. With such a blend of polycarbonate or copolycarbonate with poly- or copolybutylenterephthalate or glycol-modified poly- or copolycyclohexane-dimethylenterephthalate it can preferably be one with 1 to 90 wt. % polycarbonate or copolycarbonate and 99 to 10 wt. % poly- or copolybutylenterephthalate or glycol-modified poly- or copolycyclohexane-dimethylenterephthalate, preferably with 1 to 90 wt. % polycarbonate and 99 to 10 wt. % polybutylenterephthalate or glycol-modified polycyclohexane-dimethylenterephthalate, wherein these amounts add up to 100 wt. %.

Particularly preferably such a blend can consist of polycarbonate or copolycarbonate with poly- or copolybutylenterephthalate or glycol-modified poly- or copolycyclohexane-dimethylenterephthalate of such a one with 20 to 85 wt. % polycarbonate or copolycarbonate and 80 to 15 wt. % poly- or copolybutylenterephtbalate or glycol-modified poly- or copolycyclohexane-dimethylenterephthalate, preferably with 20 to 85 wt. % polycarbonate and 80 to 15 wt. % polybutylenterephthalate or glycol-modified polycyclohexane-dimethylenterephthalate, wherein the amounts add up to 100 wt. %. Particularly preferably such a blend can consist of polycarbonate or copolycarbonate with poly- or copolybutylenterephthalate or glycol-modified poly- or copolycyclohexane-dimethylenterephthalate of such a one with 35 to 80 wt. % polycarbonate or copolycarbonate and 65 to 20 wt. % poly- or copolybutylenterephthalate or glycol-modified poly- or copolycyclohexane dimethylenterephthalate, preferably with 35 to 80 wt. % polycarbonate and 65 to 20 wt. % polybutylenterephthalate or glycol-modified polycyclohexane-dimethylenterephthalate, wherein the amounts add up to 100 wt. %. In particularly preferred embodiments the blends can consist of polycarbonate and glycol-modified polycyclohexane dimethylenterephthalate in the compositions mentioned above.

Suitable polycarbonates or copolycarbonates in preferred embodiments are particularly aromatic polycarbonates or copolycarbonates.

The polycarbonates or copolycarbonates can be linear or branched in the known way.

The manufacture of these polycarbonates can take place in the known way from diphenols, carbonic acid derivatives, possibly chain breaking agents and possibly branching agents. Details of the manufacture of polycarbonates have been documented in a number of patent documents over the last 40 years. Examples referred to are Schnell, "Chemistry and Physics of Polycarbonates", Polymer Reviews, volume 9, Interscience Publishers, New York, London, Sydney 1964, also D. Freitag, U. Grigo, P. R. Müller, H. Nouvertne', BAYER AG, "Polycarbonates" in Encyclopaedia of Polymer Science and Engineering, volume 11, Second Edition, 1988, pages 648-718 and lastly also Dres. U. Grigo, K. Kirchner and P. R. Miller "Polycarbonates" in Becker/Braun, Kunststoff-Handbuch, volume 3/1, polycarbonates, polyacetate, polyester, cellulose ester, Carl Hanser Verlag Munich, Vienna 1992, pages 117-299.

Suitable diphenols can for example be dihydroxyaryl compounds with the general formula (I),

$$HO-Z-OH \qquad (I)$$

where Z is an aromatic radical with 6 to 34 C atoms that can contain one or more possibly substituted aromatic nuclei and aliphatic or cycloaliphatic radicals or alkylaryls or heteroatoms as bridging elements.

Examples of suitable dihydroxyaryl compounds are: dihydroxybenzenes, dihydroxydiphenyls, bis-(hydroxyphenyl)-alkanes, bis-(hydroxyphenyl)-cycloalkanes, bis-(hydroxyphenyl)-aryls, bis-(hydroxyphenyl)-ethers, bis-(hydroxyphenyl)-ketones, bis-(hydroxyphenyl)-sulfides, bis-(hydroxyphenyl)-sulfones, bis-(hydroxyphenyl)-sulfoxides, 1,1'-bis-(hydroxyphenyl)-diisopropylbenzenes as well as their cemalcylated and nucleus-halogenated compounds.

These and other suitable dihydroxyaryl compounds are for example described in DE-A 3 832 396, FR-A 1 561 518, in H. Schnell, Chemistry and Physics of Polycarbonates, Interscience Publishers, New York 1964, p. 28 ff.; p. 102 ff. and in D. G. Legrand, J. T. Bendler, Handbook of Polycarbonates Science and Technology, Marcel Dekker New York 2000, p. 72 ff.

Preferred dihydroxyaryl compounds are for example resorcinol, 4,4'-dihydroxydiphenyl, bis-(4-hydroxyphenyl)-methane, bis-(3,5-dimethyl-4-hydroxyphenyl)-methane, bis-(4-hydroxyphenyl)-diphenyl-methane, 1,1-bis-(4-hydroxyphenyl)-1-phenyl-ethane, 1,1-bis-(4-hydroxyphenyl)-1-(1-naphthyl)-ethane, 1,1-bis-(4-hydroxyphenyl)-1-(2-naphthyl)-ethane,

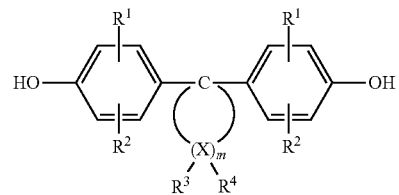

2,2-bis-(4-hydroxyphenyl)-propane, 2,2-bis-(3-methyl-4-hydroxyphenyl)-propane, 2,2-bis-(3,5-dimethyl-4-hydroxyphenyl)-propane, 2,2-bis-(4-hydroxyphenyl)-1-phenyl-propane, 2,2-bis-(4-hydroxyphenyl)-hexafluoride-propane, 2,4-bis-(4-hydroxyphenyl)-2-methylbutane, 2,4-bis-(3,5- dimethyl-4-hydroxyphenyl)-2-methylbutane, 1,1-bis-(4-hydroxyphenyl)-cyclohexane, 1,1-bis-(3,5-dimethyl-4-hydroxyphenyl)-cylohexane, 1,1-bis-(4-hydroxyphenyl)-4-methyl-cylohexane, 1,3-bis-[2-(4-hydroxyphenyl)-2-propyl]-benzene, 1,1'-bis-(4-hydroxyphenyl)-3-diisopropyl-benzene, 1,1'-bis-(4-hydroxyphenyl)-4-diisopropyl-benzene, 1,3-bis-[2-(3,5-dimethyl-4-hydroxyphenyl)-2-propyl]-benzene, bis-(4-hydroxyphenyl)-ether, bis-(4-hydroxyphenyl)-sulfide, bis-(4-hydroxyphenyl)-sulfone, bis-(3,5-dimethyl-4-hydroxyphenyl)-sulfone and 2,2',3,3'-tetrahydro-3,3,3',3'-tetramethyl-1,1'-spirobi-[1H-indene]-5,5'-diol or dihydroxydiphenylcycloalkanes with the formula (Ia)

where $R^1$ and $R^2$ independently from each other, mean hydrogen, halogen, preferably chlorine or bromine, $C_1$-$C_8$-alkyl, $C_5$-$C_6$-cycloalkyl, $C_6$-$C_{10}$-aryl, preferably phenyl, and $C_7$-$C_{12}$-aralkyl, preferably phenyl-$C_1$-$C_4$-alkyl, in particular benzyl, m is an integer of 4 to 7, preferably 4 or 5, $R^3$ and $R^4$ are individually selectable for each X independently from each other and are hydrogen or $C_1$-$C_6$-alkyl and X means carbon, under the stipulation that X, $R^3$ and $R^4$ also mean alkyl on at least one atom. Alkyl is simultaneously preferred in formula (Ia) on one or two atom(s) X, in particular at just one atom X $R^3$ and $R^4$.

The preferred alkyl radical for radicals $R^3$ and $R^4$ in formula (Ia) is methyl. The X atoms in alpha position to the diphenyl-substituted C atom (C-1) are preferably not dialkyl-substituted, whilst the alkyl di-substitution in beta position to C-1 is preferred.

Particularly preferred dihydroxydiphenylcycloalkanes with the formula (Ia) are those with 5 and 6-ring C atoms X in the cycloaliphatic radical (m=4 or 5 in formula (Ia)), for example the diphenols with the formulas (Ia-1) to (Ia-3),

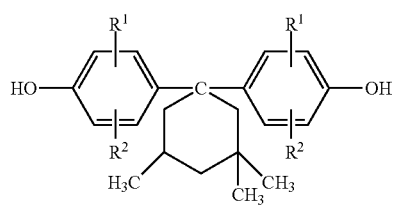
(Ia-1)

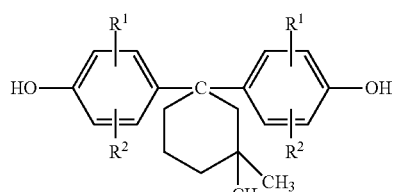
(Ia-2)

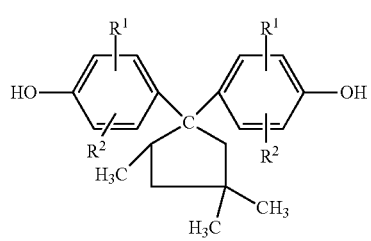
(Ia-3)

One particularly preferred dihydroxydiphenylcycloalkane with the formula (Ia) is 1,1-bis-(4-hydroxyphenyl)-3,3,5-trimethyl-cyclohexane (formula (Ia-1) with $R^1$ and $R^2$ equals H).

According to EP-A 359 953 such polycarbonates can be manufactured from dihydroxydiphenylcycloalkanes with the formula (Ia).

Particularly preferred dihydroxyaryl compounds are resorcinol, 4,4'-dihydroxydiphenyl, bis-(4-hydroxyphenyl)-diphenyl-methane, 1,1-bis-(4-hydroxyphenyl)-1-phenyl-ethane, bis-(4-hydroxyphenyl)-1-(1-naphthyl)-ethane, bis-(4-hydroxyphenyl)-1-(2-naphthyl)-ethane, 2,2-bis-(4-hydroxyphenyl)-propane, 2,2-bis-(3,5-dimethyl-4-hydroxyphenyl)-propane, 1,1-bis-(4-hydroxyphenyl)-cyclohexane, 1,1-bis-(3,5-dimethyl-4-hydroxyphenyl)-cyclohexane, 1,1-bis-(4-hydroxyphenyl)-3,3,5-trimethyl-cyclohexane, 1,1'-bis-(4-hydroxyphenyl)-3-diisopropyl-benzene and 1,1'-bis-(4-hydroxyphenyl)-4-diisopropyl-benzene.

Most particularly preferred dihydroxyaryl compounds are 4,4'-dihydroxydiphenyl and 2,2-bis-(4-hydroxyphenyl)-propane.

A dihydroxyaryl compound forming homopolycarbonates as well as various dihydroxyaryl compounds forming copolycarbonates can also be used. A dihydroxyaryl compound with the formula (I) or (Ia) forming homopolycarbonates as well as several dihydroxyaryl compounds with the formula (I) and/or (Ia) forming copolycarbonats can also be used. The various dihydroxyaryl compounds can be linked with each other statistically as well as in blocks. In the case of copolycarbonates of dihydroxyaryl compounds with the formula (I) and (Ia) the molar ratio of the dihydroxyaryl compounds with the formula (Ia) to the possibly also used other dihydroxyaryl compounds with formula (I) is preferably between 99 mol % (Ia) to 1 mol % (I) and 2 mol % (Ia) to 98 mol % (1), preferably between 99 mol % (Ia) to 1 mol % (I) and 10 mol % (Ia) to 90 mol % (I), and in particular between 99 mol % (Ia) to 1 mol % (I) and 30 mol % (Ia) to 70 mol % (I).

One particularly preferred copolycarbonate can be manufactured using 1,1-bis-(4-hydroxyphenyl)-3,3,5-trimethyl-cyclohexane and 2,2-bis-(4-hydroxyphenyl)-propane dihydroxyaryl compounds with the formula (Ia) and (I).

Suitable carbonic acid derivatives can for example be diarylcarbonates with the general formula (II),

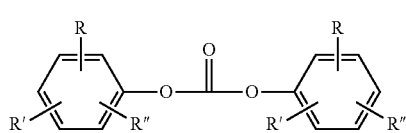
(II)

where

R, R' and R" independently from each other, stand equally or differently for hydrogen, linear or branched $C_1$-$C_{34}$-alkyl, $C_7$-$C_{34}$-alkylaryl or $C_6$-$C_{34}$-aryl, R can also mean —COO—R''', wherein R''' stands for hydrogen, linear or branched $C_1$-$C_{34}$-alkyl, $C_7$-$C_{34}$-alkylaryl or $C_6$-$C_{34}$-aryl.

Preferred diarylcarbonates are for example diphenylcarbonate, methylphenyl-phenyl-carbonates and di-(methylphenyl)-carbonates, 4-ethylphenyl-phenyl-carbonate, di-(4-ethylphenyl)-carbonate, 4-n-propylphenyl-phenyl-carbonate, di-(4-n-propylphenyl)-carbonate, 4-iso-propylphenyl-phenyl-carbonate, di-(4-iso-propylphenyl)-carbonate, 4-n-butylphenyl-phenyl-carbonate, di-(4-n- butylphenyl)-carbonate, 4-iso-butylphenyl-phenyl-carbonate, di-(4-iso-butylphenyl)-carbonate, 4-tert-butylphenyl-phenyl-carbonate, di-(4-tert-butylphenyl)-carbonate, 4-n-pentylphenyl-phenyl-carbonate, di-(4-n-pentylphenyl)-carbonate, 4-n-hexylphenyl-phenyl-carbonate, di-(4-n-hexylphenyl)-carbonate, 4-iso-octylphenyl-phenyl-carbonate, di-(4-iso-octylphenyl)-carbonate, 4-n-nonylphenyl-phenyl-carbonate, di-(4-n-nonylphenyl)-carbonate, 4-cyclohexylphenyl-phenyl-carbonate, di-(4-cyclohexylphenyl)-carbonate, 4-(1-methyl-1-phenylethyl)-phenyl-phenyl-carbonate, di-[4-(1-methyl-1-phenylethyl)-phenyl]-carbonate, biphenyl-4-yl-phenyl-carbonate, di-(biphenyl-4-yl)-carbonate, 4-(i-naphthyl)-phenyl-phenyl-carbonate, 4-(2-naphthyl)-phenyl-phenyl-carbonate, di-[4-(I-naphthyl)-phenyl]-carbonate, di-[4-(2-naphthyl)phenyl]-carbonate, 4-phenoxyphenyl-phenyl-carbonate, di-(4-phenoxyphenyl)-carbonate, 3-pentadecylphenyl-phenyl-carbonate, di-(3-pentadecylphenyl)-carbonate, 4-tritylphenyl-phenyl-carbonate, di-(4-tritylphenyl)-carbonate, methylsalicylate-phenyl-carbonate, di-(methylsalicylate)-carbonate, ethylsalicylate-phenyl-carbonate, di-(ethylsalicylate)-carbonate, n-propylsalicylate-phenyl-carbonate, di-(n-propylsalicylate)-carbonate, iso-propylsalicylate-phenyl-carbonate, di-(iso-propylsalicylate)-carbonate, n-butylsalicylate-phenyl-carbonate, di-(n-butylsalicylate)-carbonate, iso-butylsalicylate-phenyl-carbonate, di-(iso-butylsalicylate)-carbonate, tert-butylsalicylate-phenyl-carbonate, di-(tert-butylsalicylate)-carbonate, di-(phenylsalicylate)-carbonate and di-(benzylsalicylate)-carbonate.

Particularly preferred diaryl compounds are diphenylcarbonate, 4-tert-butylphenyl-phenyl-carbonate, di-(4-tert-butylphenyl)-carbonate, biphenyl-4-yl-phenyl-carbonate, di-(biphenyl-4-yl)-carbonate, 4-(1-methyl-1-phenylethyl)-phenyl-phenyl-carbonate, di-[4-(1-methyl-1-phenylethyl)-phenyl]-carbonate and di-(methylsalicylate)-carbonate. Particularly preferred is diphenylcarbonate.

One diarylcarbonate as well as various diarylcarbonates can be used.

One or more monohydroxyaryl compound(s) can for example also be used as a chain breaking agent for controlling or changing the end groups that are not used for producing the diarylcarbonate or diarylcarbonates. They can be those with the general formula (III),

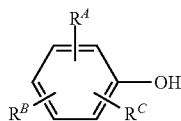

(III)

wherein $R^A$ stands for linear or branched $C_1$-$C_{34}$-alkyl, $C_7$-$C_{34}$-alkylaryl, $C_6$-$C_{34}$-aryl or for —COO—$R^D$, wherein $R^D$ stands for hydrogen, linear or branched $C_1$-$C_{34}$-alkyl, $C_7$-$C_{34}$-alkylaryl or $C_6$-$C_{34}$-aryl, and $R^B$, $R^C$ independently from each other, stand equally or differently for hydrogen, linear or branched $C_1$-$C_{34}$-alkyl, $C_7$-$C_{34}$-alkylaryl or $C_6$-$C_{34}$-aryl.

Such monohydroxyaryl compounds are for example 1-, 2- or 3-methylphenol, 2,4-dimethylphenol, 4-ethylphenol, 4-n-propylphenol, 4-iso-propylphenol, 4-n-butylphenol, 4-isobutylphenol, 4-tert-butylphenol, 4-n-pentylphenol, 4-n-hexylphenol, 4-iso-octylphenol, 4-n-nonylphenol, 3-pentadecylphenol, 4-cyclohexylphenol, 4-(1-methyl-1-phenylethyl)-phenol, 4-phenylphenol, 4-phenoxyphenol, 4-(I-naphthyl)-phenol, 4-(2-naphthyl)-phenol, 4-tritylphenol, methylsalicylate, ethylsalicylate, n-propylsalicylate, iso-propylsalicylate, n-butylsalicylate, iso-butylsalicylate, tert-butylsalicylate, phenylsalicylate and benzylsalicylate. Preferred are 4-tert-butylphenol, 4-iso-octylphenol and 3-pentadecylphenol.

Suitable branching agents can be compounds with three and more functional groups, preferably those with three or more hydroxyl groups.

Suitable compounds with three or more phenolic hydroxyl groups are for example phloroglucinol, 4,6-dimethyl-2,4,6-tri-(4-hydroxyphenyl)-heptene-2, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-(4,4-bis-(4-hydroxyphenyl)-cyclohexyl]-propane, 2,4-bis-(4-hydroxyphenyl-isopropyl)-phenol and Tetra-(4-hydroxyphenyl)-methane.

Other suitable compounds with three and more functional groups are for example 2,4-dihydroxy benzoic acid, trimesic acid (trichloride), cyanuric acid trichloride and 3,3-bis-(3-methyl-4-hydroxyphenyl)-2-oxo-2,3-dihydroindol.

Preferred branching agent are 3,3-bis-(3-methyl-4-hydroxyphenyl)-2-oxo-2,3-dihydroindol and 1,1,1-tri-(4-hydroxyphenyl)-ethane.

The plastic component containing the above mentioned thermoplastic polymers can be extruded, co-extruded, cast, 3D-printed and/or injection moulded. The plastic component can also be a three-dimensional plastic component. It is further possible that the plastic component is a film, a film layer compound and/or a panel, as well as a combination of the same, for example a back-injected film, which contain the polymers described above. The plastic component is particularly preferably a film, a film layer compound and/or a panel containing the above mentioned polymers, produced by means of extrusion and/or co-extrusion.

The dye bath can be heated to a temperature of 99° C. This can improve the intensity of the partial dyeing depending on the polymer used in the plastic component. For an irradiation of the plastic components in an autoclave the dye bath can also be heated to 150° C. if the thermostability of the plastic components allows this. In a preferred embodiment of the method according to the invention the temperature of the dye bath is ≤70° C., preferably ≥10° C. to ≤60° C., particularly preferably ≥15° C. to ≤50° C.

The dye bath can comprise at least one colorant, preferably at least one dye, particularly preferably at least one dye of the group of solvent dyes and/or disperse dyes according to the classification of the Colour Index or mixtures of these dyes.

The Colour Index (CI) of the Society of Dyers and Colourists and the American Association of Textile Chemists and Colorists clearly characterises all colorants by means of the group name and the figures for the chemical composition or chemical structure.

Dyes of the group of solvent dyes according to the Colour Index classification can for example be the so-called Macrolex™ dyes from company Lanxess AG, Germany. Examples mentioned are Macrolex™ Blue 3R, Macrolex™ Red H, Macrolex™ Yellow 6G (Solvent Yellow 179 according to the CI), MacrolexT™ Violet Red R (Disperse Violet 31 according to the CI), Macrolex™ Orange R (Solvent Orange 107 according to the CI) or mixtures of these dyes.

Dyes of the group of disperse dyes according to the Colour Index classification can for example be diazo, diphenylamine and anthrachinon compounds, acetate dyes, dispersion dyes and/or dispersol dyes and include Disperse Blue #3, Disperse Blue #14, Disperse Yellow #3, Disperse Red #134 and Disperse Red #7. The classification and description of the above cited dyes agree with "The Colour Index", issue 3, published jointly by the Society of Dyes and Colors and the American Association of Textile Chemists and Colorists (1971). In general the dyes can either be used as a single dye component or as a component of a mixture depending on the desired colour. The term dyes used here therefore also includes the dye mixture.

The suitable dyes can include water-insoluble diazo-diphenylamine and anthrachinon compounds. Particularly suitable are acetate dyes, dispersed acetate dyes, dispersion dyes and dispersol dyes as disclosed in the Colour Index, issue 3, volume 2, The Society of Dyers and Colourists, 1971. p. 2479 or 2187-2743.

The preferred dispersed dyes include Dystar's Palanil Blue E-R150 (anthrachinon/disperse Blue), DIANIX Orange E-3RN (azodye/Cl Disperse Orange 25) and the above mentioned Macrolex™ dyes as solvent dyes.

In one embodiment the dye bath includes:
a) solvent and/or dispersing agent, preferably water and/or an organic solvent, particularly preferably water
b) colorant, preferably a dye, particularly preferably a dye of the solvent dyes and/or disperse dyes according to the Colour Index classification.

Those dye baths that are suitable for the consistent dyeing of polycarbonate plastic components at temperatures of >80° C. have been found to be of advantage. These are for example described WO-A 03/040461, EP-A 2050866, WO-A 03/083207. A partial dyeing of the plastic component in the irradiated areas substantially takes place under the conditions of the method according to the invention, so that a more intensive engraving becomes visible at precisely these points.

In a further embodiment of the invention the dye bath therefore also contains, in addition to the components a) and b) already mentioned,
c) at least one further solvent according to the structure formula (I)

$$R-[(O-(CH_2)_m)_n-]OH \quad (I),$$

where R is an ethyl, propyl or butyl radical,
m is 2, 3 or 4 and
n is 1, 2 or 3,
under the stipulation that, if R is butyl, m is 2 or 4,
d) at least one levelling agent according to the structure formula (II):

$$H-[(O-(CH_2)_m)_n-]OH \quad (II),$$

where m is 2, 3 or 4 and
n is 1, 2 or 3.

Components a) to d) can be included in the following quantities related to the total weight of the dye bath:
a) 50.0 to 99.99 wt. %, preferably 62.5 to 90.0 wt. %, particularly preferably 65.0 to 85.0 wt. %,
b) 0.01 to 15.0 wt. %, preferably 0.1 to 5.0 wt. %, particularly preferably 0.2 to 4.0 wt. %,
c) 0 to 35.0 wt. %, preferably 1.0 to 30.0 wt. %, particularly preferably 5.0 to 25.0 wt. %,
d) 0 to 30.0 wt. %, preferably 1.0 to 20.0 wt. %, particularly preferably 3.0 to 15.0 wt. %.

In a further embodiment of the method according to the invention the dye bath comprises a dye and/or a dye mixture selected from the group of disperse dyes according to the Colour Index classification, in particular a dye selected from the group consisting of azo, diphenylamine and anthrachinon compounds.

In another preferred embodiment of the method according to the invention the dye bath comprises a dye and/or a dye mixture from the group of solvent dyes according to the Colour Index classification, particularly preferably a dye and/or dye mixture of Makrolex™ dyes.

The solvent and/or dispersing agent a) used can be water and/or an organic solvent. Water is preferably used.

The organic solvent can be any conventional solvent that will not attack the plastic component upon contact. Examples to be mentioned are butylalcohol, butyleneglycol, diethyleneglycol, ethylalcohol, ethyleneglycol, heptane, hexane, pentane, propargylalcohol, propylalcohol or mixture of the above mentioned.

Water and c) are preferably used with the method according to the invention.

The irradiation of the plastic component during step iii) is realised with non-ionising electromagnetic radiation, preferably focussed non-ionising electromagnetic radiation with a wavelength within a range of $\geq 0.1$ μm to $\leq 1$ mm, particularly preferably focussed non-ionising electromagnetic radiation with a wavelength within a range of $\geq 0.15$ μm to $\leq 20$ μm, particularly preferably with laser radiation with a wavelength within a range of $\geq 0.15$ μm to $\leq 20$ μm.

Where the irradiation is carried out with a laser this can be realised by means of continuous beam radiation (CW laser). Particularly preferably pulsed laser radiation is used for the irradiation of the plastic components. For this a pulse duration of the laser of a fraction of seconds will suffice for achieving a coloration of the plastic component at the laser-irradiated points. Pulse durations of $10^{-18}$ to $10^{-1}$ seconds, particularly preferably pulse durations of $10^{-9}$ to $10^{-2}$ seconds, most preferably pulse durations of $10^{-6}$ to $10^{-3}$ seconds are preferably used.

The intensity of the coloration at the lasered points can be influenced by varying the capacity of the laser beam used for irradiation during step iii) depending on the requirements of the desired application. The higher the laser capacity used, the more intense the coloration of the lasered points of the plastic component will be. Sufficiently good colour engraving can be realised with a median capacity range of a 7.5 watt marking laser. Higher capacities, and therefore also a more intense dyeing of the plastic component, can be realised with pulsed operation.

The method according to the invention preferably uses NdYAG lasers (neodymium-doped yttrium-aluminium garnet lasers). The shorter the pulse, the higher the peak pulse capacity. Pulse peaks of 100 kJ can be realised with pulse periods of 15 ns to 400 ns. It is however also possible to use laser types that are suitable for engraving and welding plastics for the colour laser engraving of plastic components. A $CO_2$ laser can thus for example also be used.

The submersion depth of the plastic component in the dye bath during step i) can have an influence on the intensity of the dyeing following irradiation during step iii) with the method according to the invention. Submersion depth should be understood in the sense of this invention as the penetration depth of the radiation used into the dye bath up to the surface of the plastic component to which the partial dyeing is to be applied. In total the submersion depth should not be too deep, as the intensity of the radiation used decreases as the submersion depth of the radiation into the dye bath increases up to the plastic surface. Ideally the submersion depth of the plastic component into the dye bath during step i) in one embodiment is $\leq 120$ mm, preferably 0.01 to 100 mm, particularly preferably 0.1 to 20 mm and most preferably 0.1 to 5.0 mm.

Where the surface of the plastic component is pre-treated in a special way to increase surface energy, for example by means of plasma treatment, corona treatment, flame treatment or chemical treatment of the plastic components, even smaller submersion depths of the plastic component can be realised during step i). The improved cross-linking of the plastic surface by the dye bath can for example result in a submersion depth of just 0.015 mm.

The colour concentration of the dye bath can also have an influence on the intensity of the partial dyeing of the plastic component following irradiation. Preferred is dye concentration b) of 0.01 to 15.0 wt. %, particularly preferably of 0.1 to 5.0 wt. %, most preferably of 0.2 to 4.0 wt. % related to the total weight of the dye bath.

In one embodiment of the method according to the invention a moulded component made of plastic, which is manufactured in an injection moulding tool with a known method such as for example the in-mould decoration (IMD), film-insert moulding (FIM) or high-pressure forming (HPF) method, is used.

In a further embodiment of the method according to the invention the plastic component is a layer construction, containing at least one layer of a thermoplastic plastic selected from polymerisates of ethylenically unsaturated monomers and/or polycondensates of bifunctionally reactive compounds, preferably of one or more polycarbonate(s) or copolycarbonate(s) on a basis of diphenols, poly- or copolyacrylate(s) and poly- or copolymethacrylate(s), poly- or copolymer(s) with styrol, polyurethane(s) as well as polyolefine(s), poly- or copolycondensate(s) of terephthalic acid, poly- or copolycondensates of naphthalindicarboxylic acid, poly- or copolycondensate(s) of at least one cycloalkyldicarboxylic acid, or mixtures of the same, particularly preferably of one or more polycarbonate(s) or copolycarbonate(s) on a basis of diphenols or blends containing at least one polycarbonate or copolycarbonate.

In a further embodiment the layer construction comprises a further layer containing at least one thermoplastic plastic and at least one laser-sensitive additive as described above. Such layer constructions are for example known from WO-A 2010/089035 and are suitable for laser engraving in black and white, in particular for the personalised laser engraving of security documents, and most particularly of identification documents.

Laser-sensitive additives can for example be so-called laser marking additives, i.e. those consisting of an absorber within the wavelength range of the laser to be used, preferably within the wavelength range of NdYAG lasers (neodymium-doped yttrium-aluminium garnet lasers). Such laser marking additives and their use in mould masses are for example described in WO-A 2004/50766 and WO-A 2004/50767 and are commercially distributed by company DSM under the tradename Micabs™. Further absorbers suitable as laser-sensitive additives are carbon black as well as phosphorous-containing mixed tin-copper oxides such as for example described in WO-A 2006/042714, whilst preferred laser-sensitive additives are black pigments, and one particularly preferred laser-sensitive additive is carbon black.

At least one layer containing at least one thermoplastic plastic can also have at least one filler. The filler is preferably at least one colour pigment and/or at least one other filler for producing a translucence in the filled layers, particularly preferably a white pigment, most preferably titanium dioxide, zirconium dioxide or barium sulfate, in one preferred embodiment it is titanium dioxide.

The filling of one layer containing at least one thermoplastic plastic with at least one such filler improves the visibility of the inserted writing or illustration(s), which also increases the perception of the improved clarity and resolution further. This layer construction is known from WO-A 2010/089035 and is described in detail therein.

With the above mentioned layer construction there is the possibility of combining the colour laser engraving according to the invention with black laser engraving. For this the plastic component comprising the layer construction described above is submersed in a dye bath of the colour to be realised, as already described in detail above (step i) and possibly step ii)), and is then irradiated with a laser beam (step iii)) for applying the colour laser engraving to the layer construction. During a further step iv) the dye bath is removed to apply the black engraving to the surface of the layer construction at the desired point with the same laser beam (step v)). The high laser reactivity of these layer constructions leads to a blackening at the points irradiated with the laser during laser engraving outside of the dye bath. When the layer construction is in the dye bath the intensity of the laser beam is reduced by said dye bath in such a way that only dyeing takes place only at the irradiated points, but no blackening of the surface of the layer construction is caused.

EXAMPLES

The plastic component to be dyed is a plastic film made of polycarbonate (Makrofol™ ID 4-4-010207 200 μm opaque white) from company Covestro Deutschland AG.

Example 1: Composition of the Dye Bath 69.31 wt. % water
0.99 wt. % Macrolex™ Blue 3R (dye from company Lanxess AG, Germany)
19.8 wt. % ethyleneglycolbutylether (EGBE), (solvent, The Dow Chemical Company)
9.9 wt. % parts diethyleneglycol (DEG), (levelling agent, Merck KGaA)

Method for Colour Laser Engraving

A NdYAG laser from company Foba was used for laser irradiation, namely Model D84 with a laser capacity of approx. 7.5 watt, a laser frequency of 8 KHz during pulsed operation and a current of 8 A. The advancing speed of the laser, the submersion depth and the temperature of the dye bath are listed in Table 1.

The Makrofol™ ID 4-4-010207 200 μm opaque white film was submersed in the dye bath according to the information in Table 1. The dye bath with the film was the placed on the workpiece carrier of a Foba D84S laser system. The focus of the laser was adjusted to the film surface. Information regarding the submersion depth can be found in Table 1. Submersion depth should be understood in the sense of this invention as the penetration depth of the radiation used into the dye bath up to the surface of the plastic component to which the partial dyeing is to be applied. it was irradiated with the laser beam.

TABLE 1

| Conditions of colour laser engraving | | |
|---|---|---|
|  | Example 2 | Example 3 |
| Dye bath | Example 1 | Example 1 |
| Temperature of dye bath | 40° C. | 40° C. |

TABLE 1-continued

| Conditions of colour laser engraving | | |
|---|---|---|
| | Example 2 | Example 3 |
| Submersion depth | 1 mm | 1 mm |
| Advancing speed | 100 mm/s | 500 mm/s |

It was possible to show with both of these examples that an intense blue dyeing in the form of the incoming laser beam appeared on the film at the points that were irradiated with the laser beam. The areas of the film that were not irradiated with the laser were substantially not dyed. An intense dyeing of the film was observed at an advancing speed of 100 mm/s.

The invention claimed is:

1. A method for the partial dyeing of plastic components, including the steps
    i) submerging a plastic component in a dye bath,
    ii) optionally heating of the dye bath,
    iii) irradiation of the plastic component from i) and optionally ii) with focused non-ionising electromagnetic radiation having a wavelength within a range of $\geq 0.1$ µm to $\leq 1$ mm, wherein the partial dyeing substantially happens only at the points irradiated during step iii).

2. The method according to claim 1, wherein step iii) is carried out by means of laser beam irradiation within a wavelength range of $\geq 0.15$ µm to $\leq 20$ µm.

3. The method according to claim 1, wherein the dye bath comprises at least one colorant.

4. The method according to claim 1, wherein the dye bath comprises at least one dye selected from the group consisting of solvent dyes and disperse dyes according to the Colour Index classification or mixtures of these dyes.

5. The method according to claim 1, wherein the submersion depth of the plastic component in step i) is $\leq 120$ mm.

6. The method according to claim 1, wherein the dye bath comprises:
    a) water and/or an organic solvent, and
    b) at least one colorant.

7. The method according to claim 6, wherein the dye bath further comprises:
    c) at least one solvent with the structure formula (I)

R—[(O—(CH$_2$)$_m$)$_n$—]OH    (I), where R is an ethyl, propyl or butyl radical,
    m is 2, 3 or 4 and
    n is 1, 2 or 3, and under the stipulation that, if R is butyl, m is 2 or 4,
    d) at least one levelling agent with the structure formula (II):

H—[(O—(CH$_2$)$_m$)$_n$—]OH    (II), where m is 2,3 or 4 and
    n is 1, 2 or 3.

8. The method according to claim 7, wherein the components a) to d) are included in the following quantities, related to the total weight of the dye solution:
    a) 50 to 99.99 wt. %,
    b) 0.01 to 15.0 wt. %,
    c) 0 to 35.0 wt. %,
    d) 0 to 30.0 wt. %.

9. The method according to claim 1, wherein the plastic component comprises at least one thermoplastic plastic selected from the group consisting of polycarbonate(s) or copolycarbonate(s) derived from diphenols, poly- or copolyacrylate(s), poly- or copolymethacrylate(s), poly- or copolymer(s) with styrol, thermoplastic polyurethane(s), polyolefine(s), poly- or copolycondensate(s) of terephthalic acid, poly- or copolycondensate(s) of naphthalindicarboxylic acid, poly- or copolycondensate(s) of at least one cycloalkyldicarboxylic acid, and mixtures thereof.

10. The method according to claim 9, wherein the plastic component is a moulded component.

11. The method according to claim 1, wherein the plastic component is a layer construction including at least one layer of a thermoplastic plastic selected from the group consisting of polymerisates of ethylenically unsaturated monomers and/or polycondensates of bifunctionally reactive compounds, polycarbonate(s) or copolycarbonate(s) derived from diphenols, poly- or copolyacrylate(s) and poly- or copolymethacrylate(s), poly- or copolymer(s) with styrol, thermoplastic polyurethane(s), polyolefine(s), poly- or copolycondensate(s) of terephthalic acid, poly- or copolycondensates of naphthalindicarboxylic acid, poly- or copolycondensate(s) of at least one cycloalkyldicarboxylic acid, or mixtures thereof.

12. The method according to claim 11, wherein the layer construction comprises a further layer, including at least one thermoplastic plastic and at least one laser-sensitive additive.

13. The method according to claim 2, wherein the method further comprises the steps:
    iv) removal of the dye bath,
    v) irradiation with the same laser beam as during step iii).

* * * * *